Dec. 14, 1965     E. EWERS     3,223,258
EQUIPMENT FOR EXPEDITING THE TRANSPORTATION OF CONTAINERS
ON RAIL-BORNE AND ROAD VEHICLES
Original Filed April 10, 1961     11 Sheets-Sheet 1
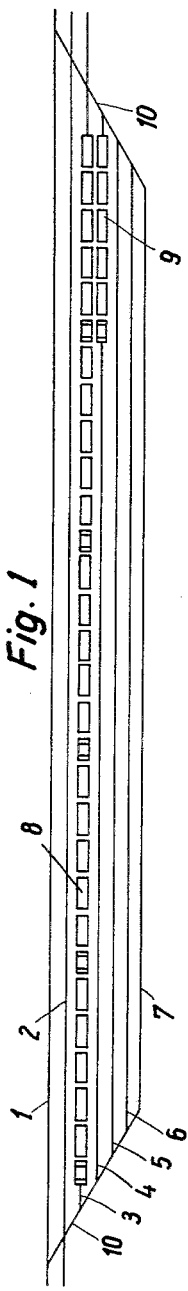
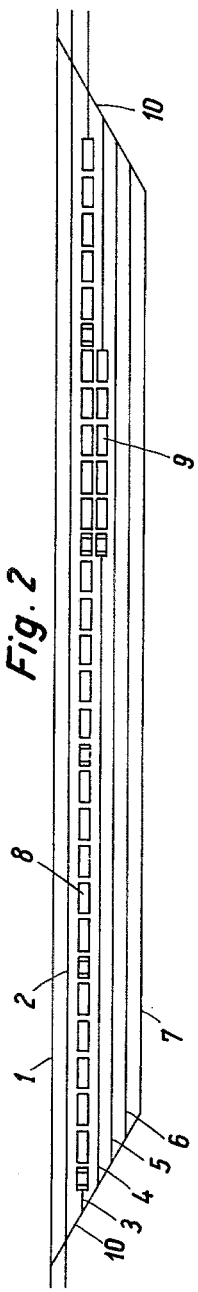
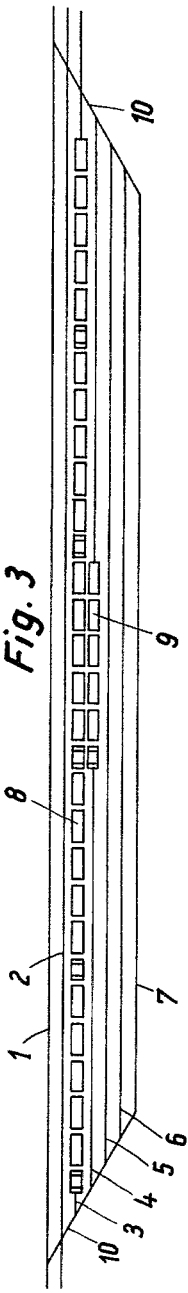
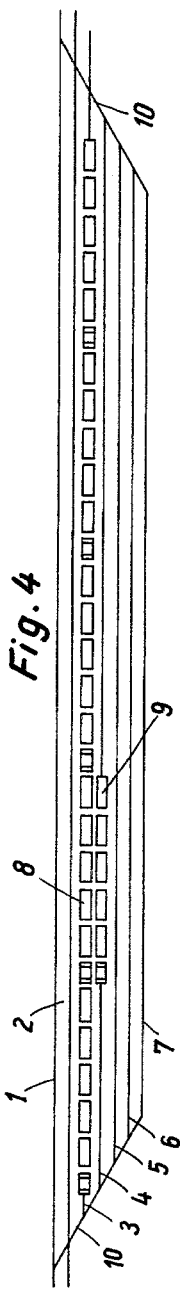
Inventor:
Engelbert Ewers

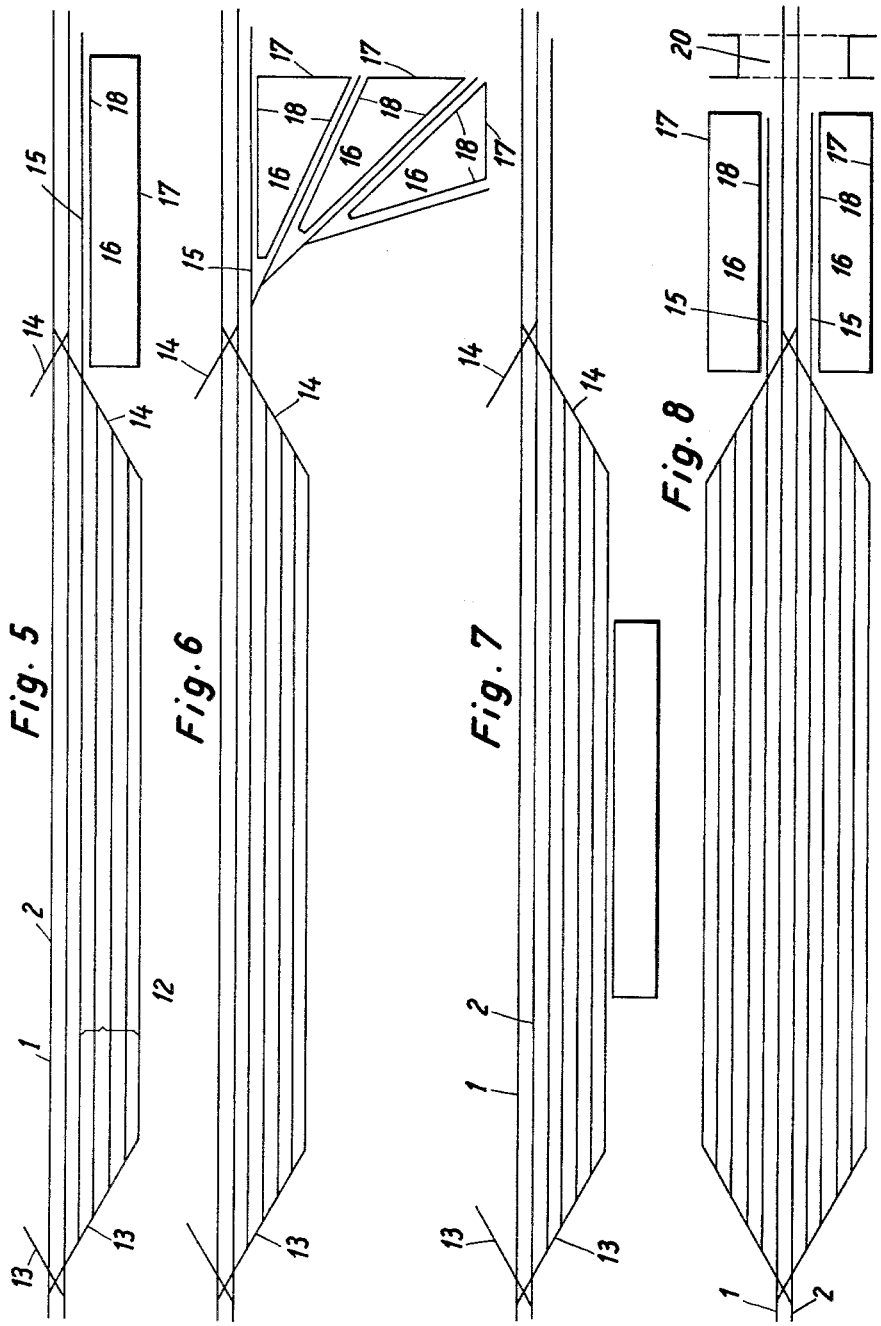

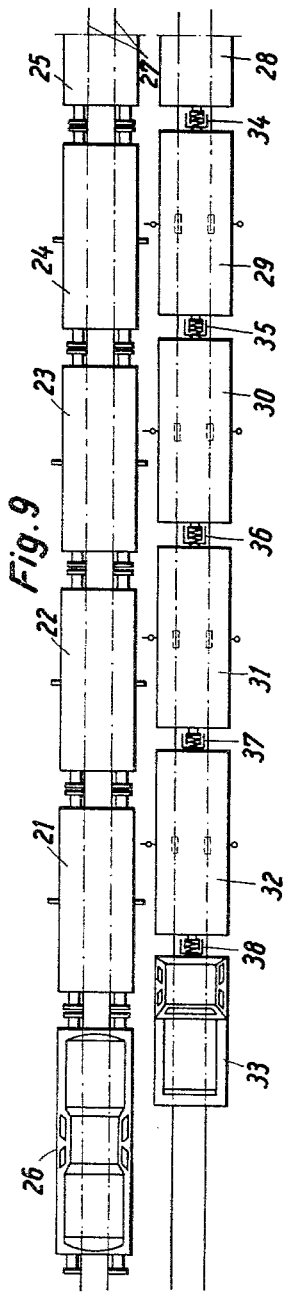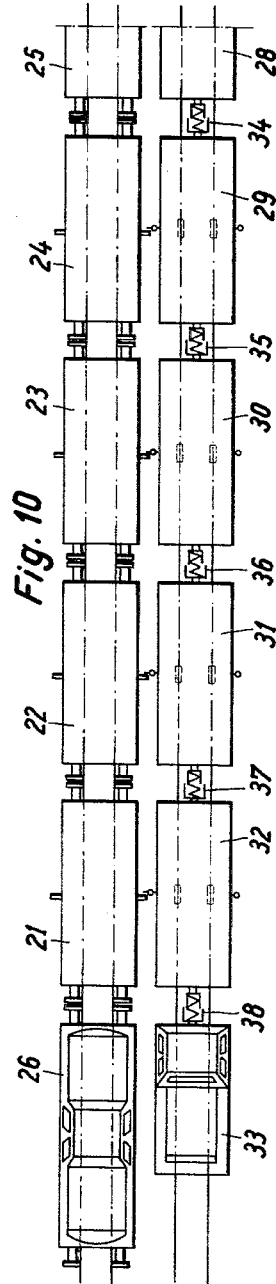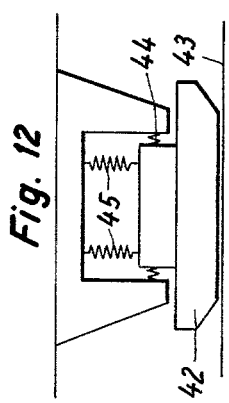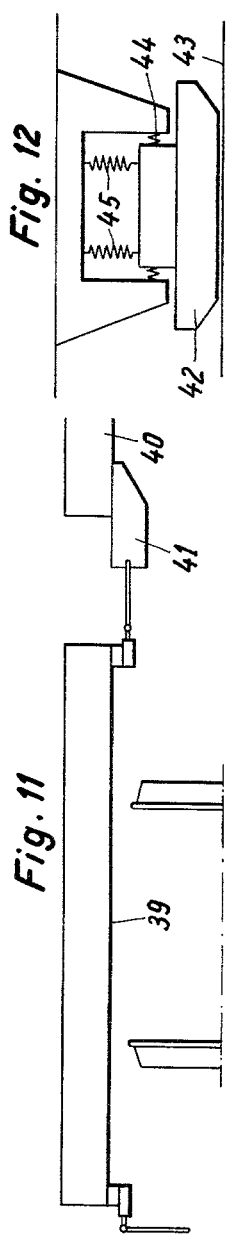

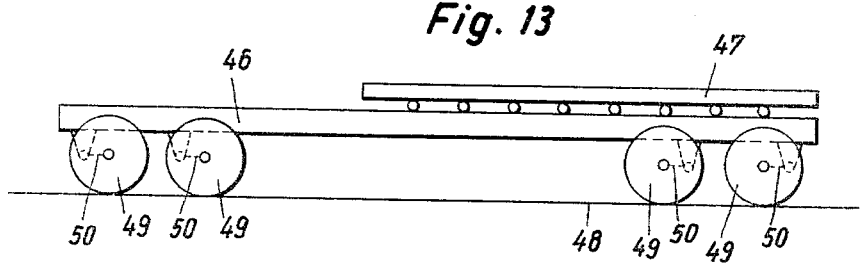
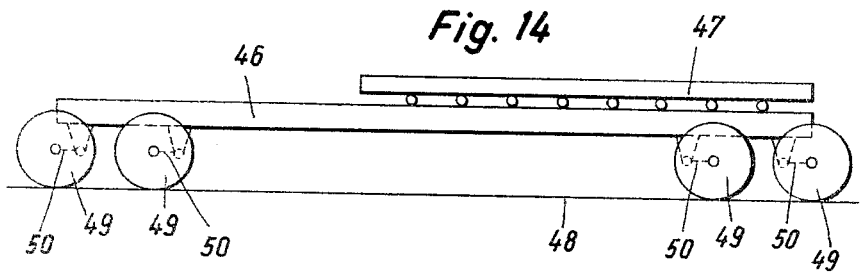
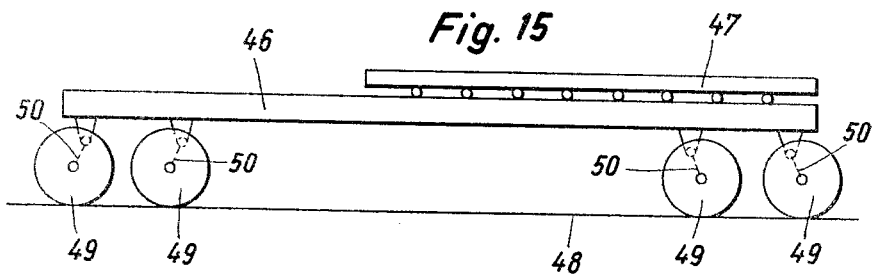

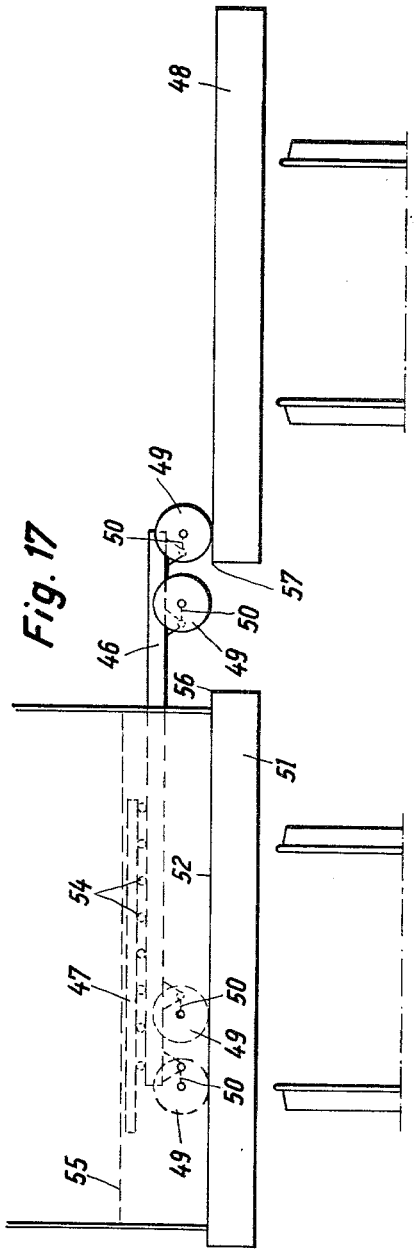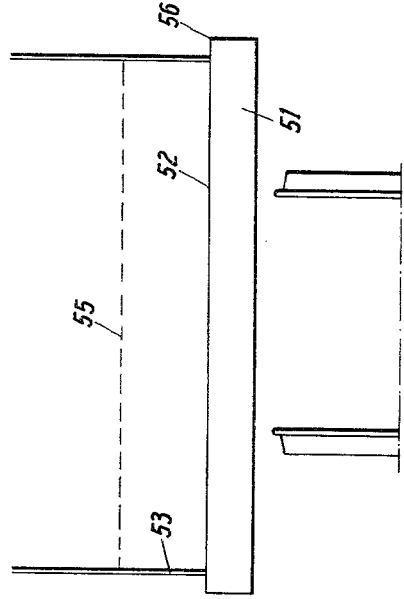

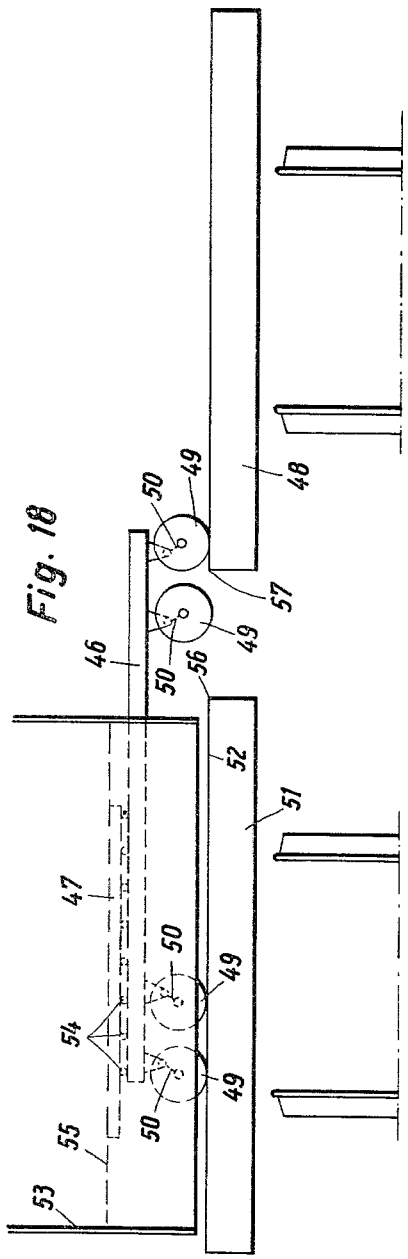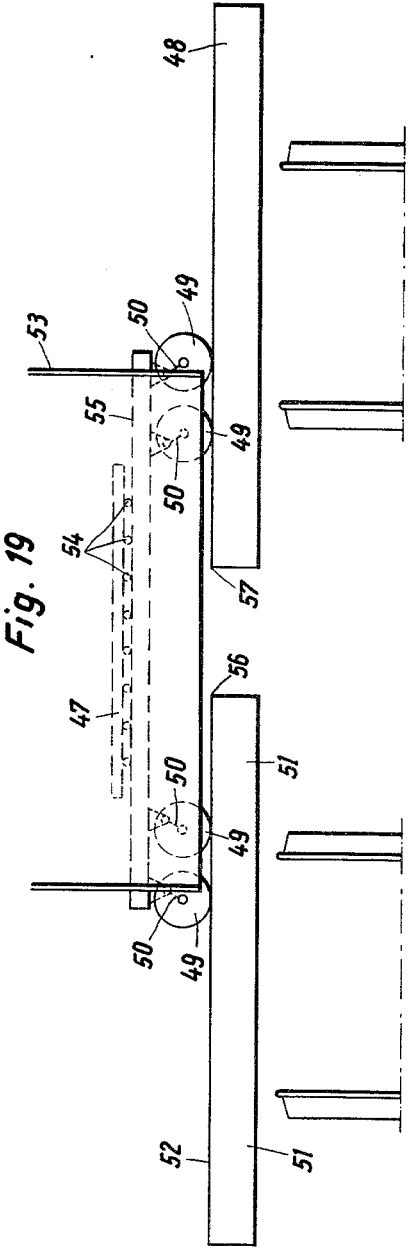

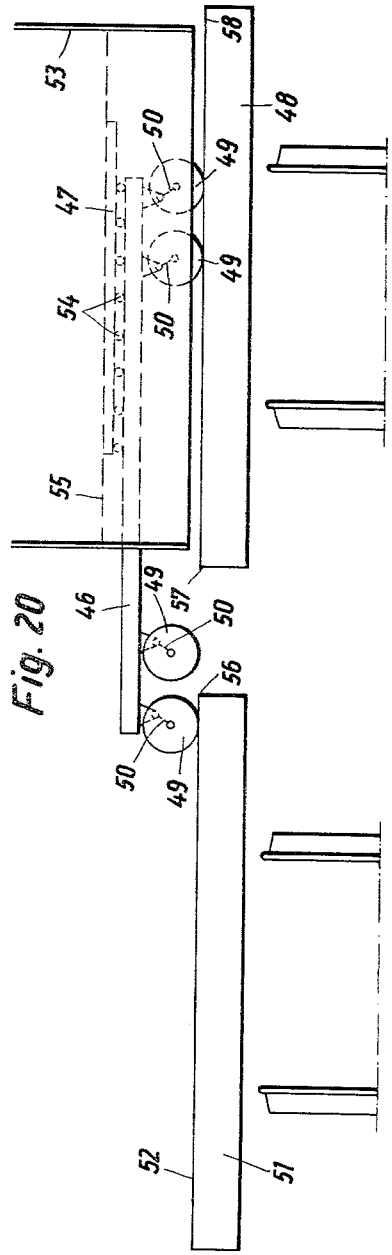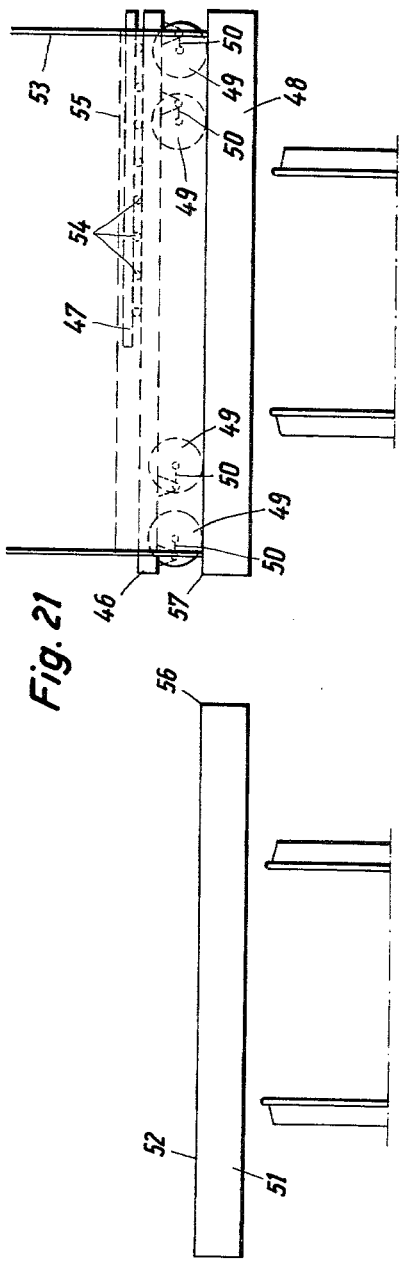

Dec. 14, 1965      E. EWERS      3,223,258
EQUIPMENT FOR EXPEDITING THE TRANSPORTATION OF CONTAINERS
ON RAIL-BORNE AND ROAD VEHICLES
Original Filed April 10, 1961      11 Sheets-Sheet 8
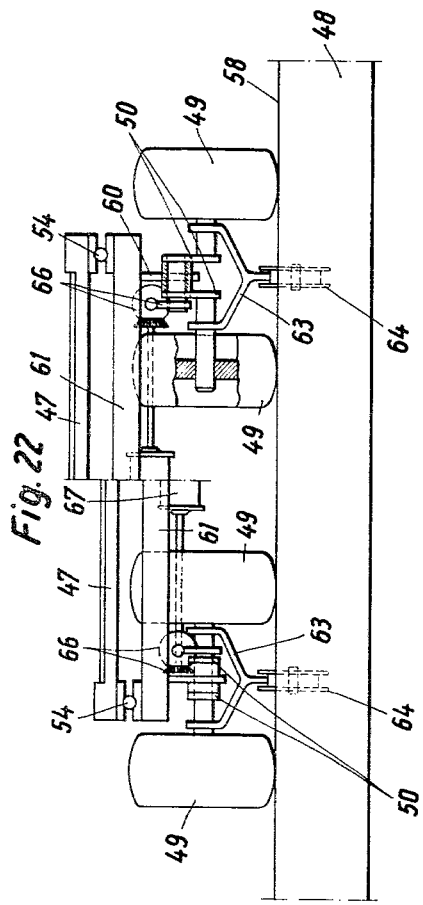
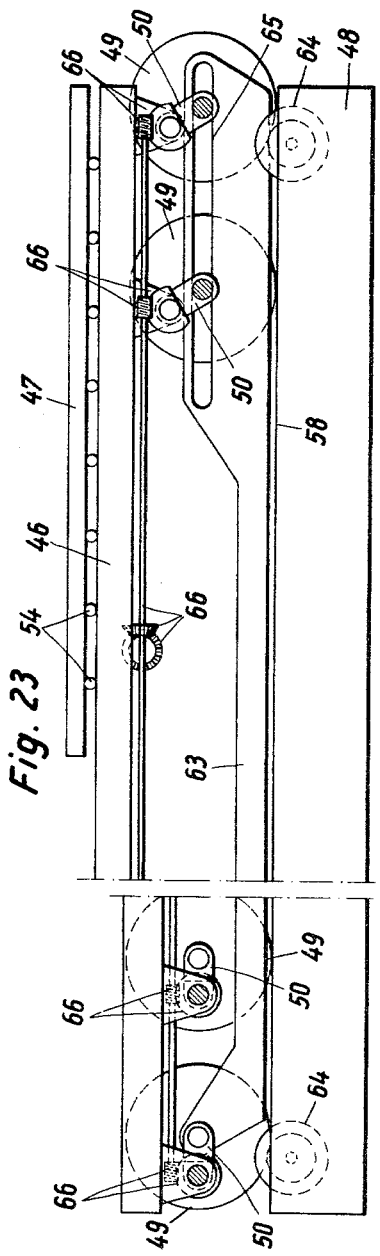
Inventor:
Engelbert Ewers

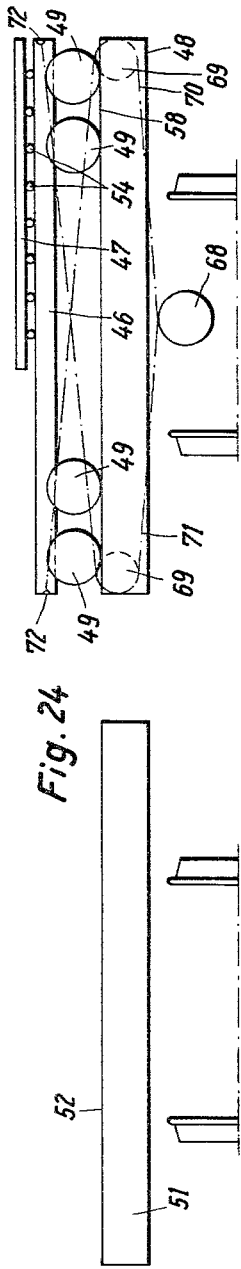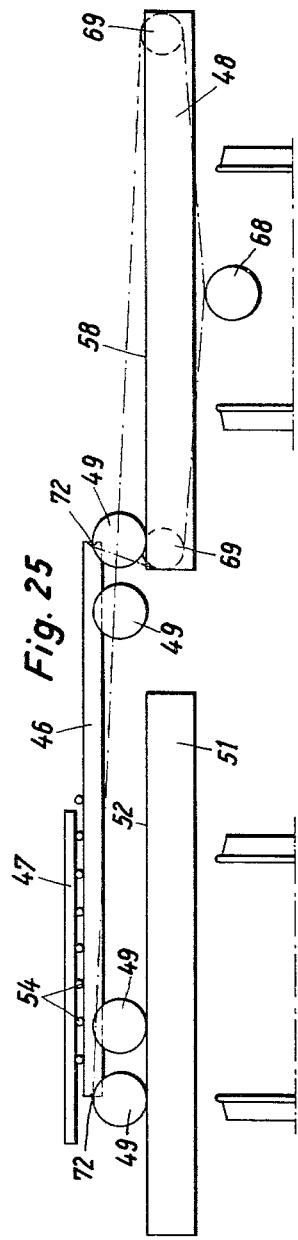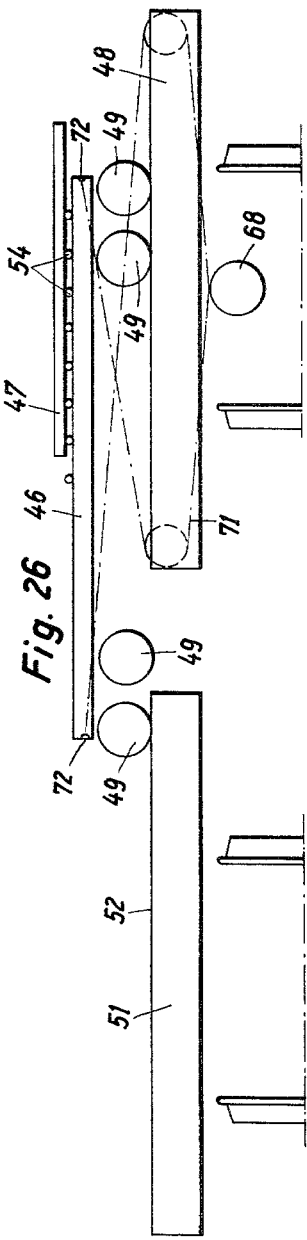

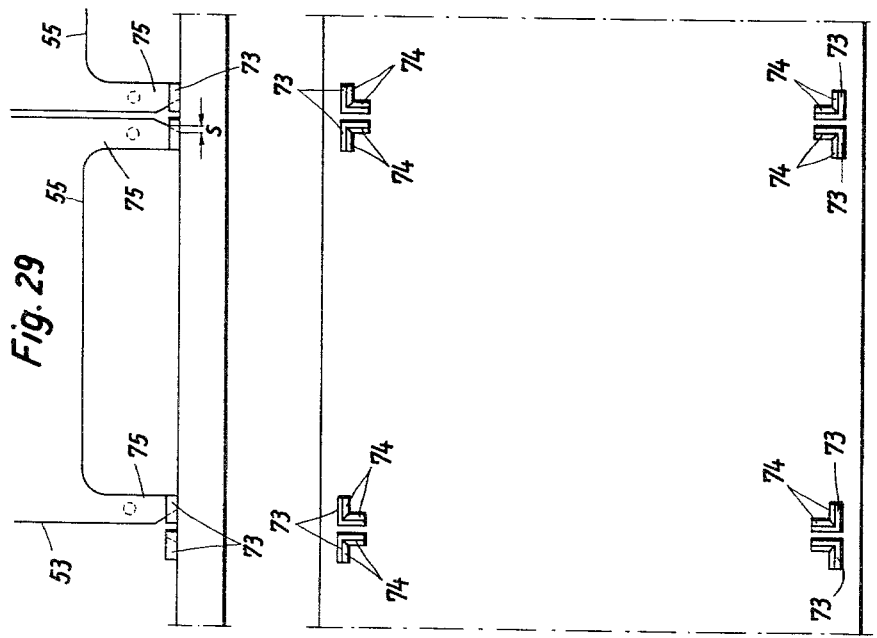

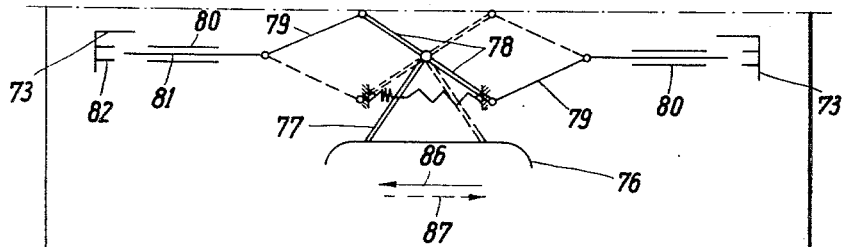
*Fig. 31*
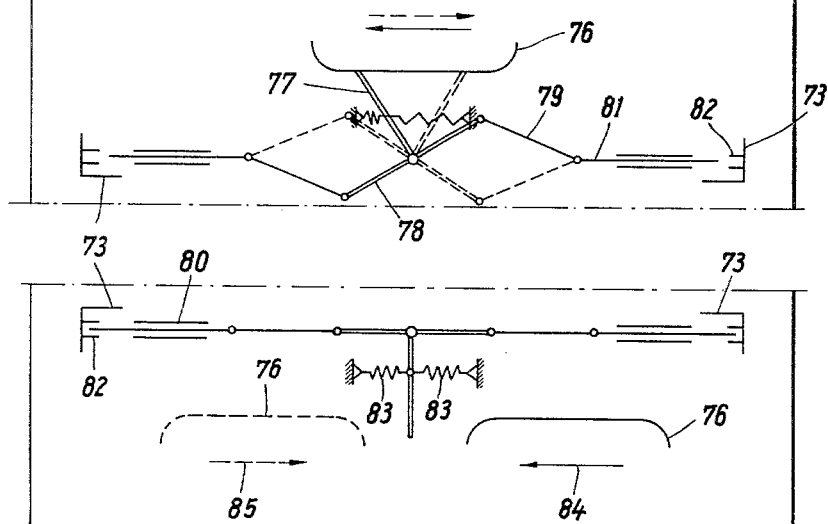
*Fig. 32*
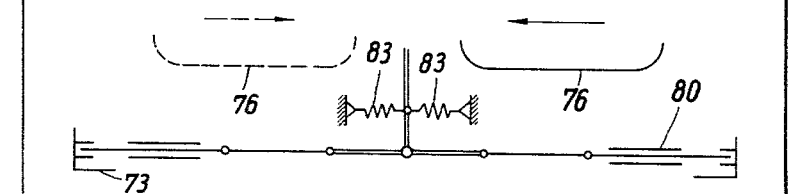

United States Patent Office 3,223,258
Patented Dec. 14, 1965

3,223,258
EQUIPMENT FOR EXPEDITING THE TRANSPORTATION OF CONTAINERS ON RAIL-BORNE AND ROAD VEHICLES
Engelbert Ewers, Kirchborchen 1, near Paderborn, Germany
Original application Apr. 10, 1961, Ser. No. 101,922. Divided and this application Apr. 19, 1962, Ser. No. 188,763
Claims priority, application Germany, Apr. 22, 1960, E 19,245
6 Claims. (Cl. 214—38)

This invention relates to equipment for transporting containers from road vehicles to rail-borne vehicles and vice versa.

The present application is a division of my copending application Serial No. 101,922, filed April 10, 1961, entitled "Method and Equipment for Expediting the Transportation of Containers on Railborne and Road Vehicles."

To expedite the transportation of goods in the form of single consignments and in bulk by means of railroad and road vehicles, various methods have been devised with the object of transporting the goods in the same shipping unit from the consigner to the consignee without reloading.

The following means and systems may be mentioned:

(1) Use of road rollers by means of which the railroad car is rolled on the road roller to the consignor or consignee and is transferred onto the track at the dispatching or receiving railroad station.

(2) Use of large-size containers: Large size containers of 5 tons' capacity are placed on railway cars and are transferred at the dispatching or receiving railway station to road delivery vehicles, which carry the container on the road.

(3) The pickaback system: Load-carrying road vehicles are transferred over a loading platform onto flat cars of the railroad and are forwarded by rail.

(4) Two-way vehicles: Vehicle bodies are used which can be placed on the road or rail wheelframes and in which the rubber-tired road wheels can be replaced by flanged rail wheel sets and vice versa.

In all of these systems, their vehicles and equipment used for the above-mentioned transportation from the consignor to the consignee, the individual shipping unit is transferred at the dispatching or receiving railroad station from the road to the rail and vice versa. This tendency is particularly pronounced in the system using large-size containers. The large-size container forming a shipping unit can be transferred only directly from the carrying railroad car directly to the road delivery vehicle or vice versa.

It is an object of the present invention to provide equipment for arranging large size shipping containers on railroad cars of a freight or container car train in proper order without requiring to rearrange the sequence of the cars in the train.

It is a further object of the present invention to provide equipment for simultaneously transferring containers onto and from a plurality of container cars coupled together to form a container car train and in which this transfer can be carried out in an efficient manner.

With these objects in view, the equipment for simultaneously transferring containers onto and from a plurality of container cars coupled together by extensible couplings to form a container car train mainly comprises a plurality of platform cars also connected to each other by extensible couplings to form a platform car train movable on tracks of a station along a loading platform and along a container car train. Each of the platform cars is provided with transfer means for transferring containers from a loading platform to the platform cars of the platform car train and from the latter to the cars of the container car train and vice versa. Furthermore, in order to align the transfer means on the cars of the platform car train with appropriate spaces on the container cars so as to make simultaneous transfer of containers from the platform cars to the container cars possible, the equipment includes also cooperating aligning means on each of the container cars of the container car train and on each of the platform cars of the platform car train for automatically aligning the transfer means on the platform cars with the container cars respectively regardless of variations of the distances between the coupled container cars of the container car train resulting from different extensions of the extensible couplings.

Further details and advantages will be described with reference to illustrative embodiments of the invention shown in the drawings as follows:

In the drawings,

FIGS. 1 to 4 are diagrammatical views of the track arrangement of a railroad station with a platform car train in different positions.

FIGS. 5 to 8 illustrate several forms of platforms with different arrangements of the stationary platforms.

FIG. 9 shows the position of the platform car train unit before it is stretched and immediately before the alignment of the individual platform cars with the container cars.

FIG. 10 shows the same platform car unit in stretched position; all platform cars have been aligned with the container cars.

FIG. 11 is a transverse sectional view showing a container car and the platform car associated therewith.

FIG. 12 shows a rail-adheringbrake and the means for suspending it from the platform car.

FIG. 13 shows a wheeled platform in position of rest, without container.

FIG. 14 shows the same wheeled platform in transfer position.

FIG. 15 shows the same wheeled platform in raised position.

FIGS. 16 to 21 show the operation of transferring the wheeled platform with container in successive phases.

FIG. 22 illustrates details of the wheeled platform partly in an end elevation and partly in a sectional view taken through the running gear of the wheeled platform.

FIG. 23 is a side elevation showing the wheeled platform.

FIGS. 24 to 26 show the drive means for moving the wheeled platform and a roller-supported slide mounted thereon in successive transfer positions.

FIG. 27 is an end view of those means for driving the wheeled platform which are carried by a platform car.

FIG. 28 is a top plan view of FIG. 27.

FIG. 29 is a side elevation of a container base and the associated corner-retaining fitting angles.

FIG. 30 is a top plan view of FIG. 29.

FIG. 31 is a diagrammatic view showing the means for locking a container on the container car, in locking position.

FIG. 32 shows the same means in release position.

*Station and Platform Layout*

In FIGS. 1 to 4, numerals 1, 2 designate the through tracks whereas numerals 3 to 7 designate the sidings parallel to these through tracks. It may be assumed that a container car train 8 has moved on track 3 and is to be subjected to predetermined handling operations at this station. The term "handling operations" includes the delivery and reception of the containers, which are either to be arranged by destination at this station or to be transferred to the road and vice versa. For this purpose the platform car train unit 9 has moved onto track 4. As it is apparent from the position of the locomotives indicated by double lines, the platform car train unit 9 has been moved initially to the container car train 8 so that the platform cars of train 9 are aligned with the last container car group of container car train 8 by to a positioning operation which will be explained in detail in FIGS. 10 and 11. It is further assumed that the last container car group of the container car train 8 carries already the containers which are to be transferred onto the road at the station shown in FIGS. 1 to 4. By means of simple transfer means, which will be described with reference to FIGS. 13 to 26, the platform car train unit 9 receives the container. Then the platform car train is shuttled over the set of points 10 to the stationary platform and back.

FIG. 2 shows the platform car train unit 9 in another position beside the container car train 8, more particularly beside its last but one group of cars.

Certain operations on the stationary platform and a subsequent shuttling movement of the platform car train unit from the stationary platform to the position shown in FIG. 2 have been performed before. These operations include the following: The containers to be forwarded by rail with the container car train 8 have been placed by load-carrying road vehicles on the stationary platform in the outer zone of the station. On this platform the containers have been pre-arranged according to destination and route and placed at the track-side edge of the platform with the aid of lift transfer trucks in a position for the transfer to the platform cars. The arrangement of the containers corresponds to the reported free positions of the respective (here the last but one) group of cars of the container car train 8. The platform car train unit has received these containers in a combined transfer movement (group movement) without change in position and has then moved over the set of points 10 to the track adjacent to the container car train to assume the position shown in FIG. 2. The containers to be loaded are then in registry with the free positions on the container car train and can be transferred, again in a combined group movement, to be finally forwarded by rail by the container car train 8.

In FIG. 3, the platform car train unit is arranged beside the last but two group of cars of the container car train 8. This follows the operations described hereinbefore with reference to FIG. 2. The containers received from the road by the platform car train unit by way of the stationary platform have been transferred by said unit to the last but one group of cars of the container car train. The platform car train unit has moved its container positions that have become free beside the last but two groups of cars and has again aligned its individual platform cars with the container cars of the third group to receive from the same the containers to be unloaded onto the road or to be re-loaded to other container car trains. Since all container positions on the platform cars were free, the transfer of the containers to be unloaded or re-loaded from the last but two group of cars is combined in one group transfer.

FIG. 4 shows the platform car train unit in alignment with the last but three group of cars of the container car train (this is the second group of cars behind the locomotive). As a freely chosen example, the platform cars receive again the containers to be unloaded or re-loaded from the second group of cars as far as free container positions are available. As the free container positions on the platform cars are not all in alignment with the containers to be unloaded or re-loaded, the transfer is successively effected in two or more smaller groups.

The four operations shown in FIGS. 1 to 4 are simplified for the sake of clarity and represented as unmixed model operations. In fact, the operations are combined in several respects. The delivery, removal and transfer of the containers are effected more or less simultaneously within and between the individual groups of the same container car train or between several container car trains. Depending on the previously received report on the free container positions of the container car train or the positions of the containers to be unloaded and re-loaded from this train, the platform car train unit will begin with the delivery or reception of the containers and will perform the exchange of containers of the car groups in a sequence which is not chronological but varies in such a manner as to enable the combination of the containers in groups and consequently the optimum utilization of the platform cars and the shortest handling time for the container car train. Besides, the platform car train unit may assume, if required, a position relative to one of the groups of cars not only in registry with entire cars but also with parts of cars corresponding to the container positions (one-fourth to four-fourths of the car length). The division and sequence of the transfer operations to be selected to ensure an optimum utilization of the platform cars and the shortest handling time for the container car train are determined before in accordance with the previously reported loading plan. The same loading plan will also determine, as has been mentioned hereinbefore, the positions of the containers to be loaded at this station along the track-side platform edge. These positions will be unchanged during the transfer from the stationary platform to the platform train unit and from the latter to the container car train (only one group movement) or be changed by a division of this transfer to the container car train into a plurality of transfer operations.

The frequency of the shuttling movements of the platform car train unit between the stationary platform in the outer zone and the respective container car train (on the adjacent track) is reduced to a minimum if the transfers of the container units to be despatched from and received at the station are combined for two or more container car trains, if possible, whereas the containers to be re-loaded are either moved between container cars of car groups of the same train having different destinations or are transferred by the platform car from one container car train to another without a shuttling movement to and from the stationary platform. The re-loading of the containers is either effected between two container car trains which are at the station at the same time and arranged on the two tracks adjacent to the platform car train unit, or between two and more container car trains arriving in succession, in which case the containers to be re-loaded are kept on the platform cars until the next train having their destination arrives whereas they are not shuttled to and from the stationary platform.

The stationary platforms mentioned hereinbefore perform two or even three functions.

(a) The containers are received from the road vehicles and transferred to the platform cars on the stationary platforms and vice versa (transfer operation).

(b) The containers to be transferred to the rail are pre-arranged on the stationary platforms in accordance with the route and the loading plan of the individual groups of cars of the associated container car train (function of arranging for destination).

(c) Containers which are to be re-loaded from one container car train to a subsequent container car train and which cannot be kept on the platform cars until the subsequent train arrives are temporarily deposited on the stationary platforms and re-arranged if desired for adaptation to the loading plan of the receiving container car train.

As the platform car train unit provides for the transfer of the containers to be loaded and unloaded at the station between the stationary platform, which must always lie in the outer parts of the station in order to be accessible by road, and the track on which the container car train is arranged, which may be any desired siding within the inner zone of the station, the layout of the loading platforms in the outer zones of the station is suitably such as to facilitate the access by road and to enable the shortest shuttling movement of the platform car train between the container cars and the loading platform.

The shuttle movements of the platform car train must always be performed over the busy sets of points. For this reason it is particularly desirable to avoid shuttle movements involving a change in directions at the sets of points.

FIGS. 5 to 8 show a number of examples of the layout of the above-mentioned stationary platforms. FIG. 5 shows a track systems comprising the main through tracks 1, 2, five sidings 12, and the two sets of points 13, 14 at both ends of the station. The drawing shows further a pull-out track 15 connected to the last protective point immediately before the main through tracks. In the normal track layout of a station this pull-out track extends, as a rule, over the hump or double incline. In the present case it extends beside the loading platform 16. The arrangement of the loading platform 16 adjacent to this pull-out track 15 reduces and simplifies the shuttle movements of the platform car train because the change in direction and the double movement over the set of points are eliminated. In connection with the above-mentioned example of the arrangement of the platform 16 it is emphasized that the pull-out track 15 is accessible from all sidings.

FIG. 6 shows three loading platforms adjacent to tracks joining the above-mentioned pull-out track 15. This layout complies also with the rebuirement that each track beside a loading platform must be reached from all sidings in a shuttle movement over the set of points.

In FIG. 7 the loading platform is disposed at the wide side of the station. This arrangement is usual in most stations. If a re-arrangement of extension of the existing station installation is not desired, the platform car train unit would have to perform its shuttle movement with a change in direction and two passes over the set of points. The increased use of the set of points would be a disadvantage.

FIG. 8 shows a double-sided station. As in FIG. 5, the loading platforms are arranged along the pull-out tracks. In accordance with the higher capacity, the tracks of the station and the loading platforms are double-sided. In stations having an even larger capacity the same layout of the two platforms as shown in FIG. 8 would be selected also for the other end of the station. In this case the transfer from and to the road will be effected on four loading platforms, pairs of oppositely arranged platforms being connected by an underground road below the main through tracks to enable an off-level road traffic.

The containers are transferred on the stationary platform 16, the dual or treble function of which has been described hereinbefore, the containers to be loaded or unloaded on the station are finally transferred from rail to road and vice versa. Thus, the loading platform affords a connection between rail and road but does not enforce a merger of the operators of both types of transportation.

The access road extends along the boundary edges 17, to which the load-carrying road vehicles move with their longitudinal side to place their containers on the loading platform just as the platform cars do at the track-side edges of the platform.

All movements of containers on the loading platform, including the transverse movements between the road-side and track-side edges of the platform as well as the movements for pre-arranging the containers according to their destination are performed by lift transfer trucks, preferably of the battery-operated type. The operation of pre-arranging the containers acccrding the destination comprises the grouping of the containers according to destination and the arrangement of the containers in a row so that they are received without change in arrangement by the platform cars according to the reported loading plan of the container car train and are transferred to the latter.

This is effected by placing the containers at the track-side edge of the loading platform. As a rule, the same lift transfer trucks directly receive the containers from and transfer them to the road vehicles unless other transfer means are used, mainly in the case of larger differences between the level to the vehicles and the platform.

*Platform Car and Container Car Trains*

To ensure a safe transfer of the containers from the stationary platform by the transfer means of the platform cars, individually or in one or more groups, the containers must be placed at a uniform distance from the track center of the platform car track and in positions evenly spaced from each other and corresponding to the container positions on the platform cars. For this purpose, corner retaining fitting angles serving as centering angles of the same design as those on the container cars and platform cars are arranged on the platform area adjacent to the track (see FIGS. 29 and 30 and the description thereof), but without locking means as shown in FIGS. 31 and 32.

All transfer movements of the containers and pallets from and to the container cars of the train and from and to the platforms are performed by transfer means, which are anchored on the platform cars and can be extended on both sides transversely thereto.

Thus, the platform cars are the main elements for all transfers of containers within the station, including transfers between the platforms and the container cars of a train, on the one hand, and between container cars of different trains or groups of cars of the same train, on the other hand. For this purpose the platform cars must be capable of moving freely and independently on all tracks throughout the station area.

To this end, standard cars of the same length as the container cars are used and are coupled to form short train units and drawn by a small switching locomotive (hereinafter referred to as a platform car locomotive).

To ensure a safe performance of the transverse transfer movements of the containers, each platform car must be moved as accurately as possible into registry with the container car or platform area to be associated with it. Since a train will always be coupled with draw hooks of different lengths and when moved into the station and braked will be partly stretched and partly compressed owing to the unequal braking of its cars, the containers cars to be served by the platform cars will be unevenly spaced from each other, as a rule. To enable nevertheless the alignment of each platform car with the associated container car, the train formed by the platform cars must be made sufficiently resilient by the provision of graded spring boxes between the draw hooks according to a certain differentiating system so that each platform car can oscillate to a sufficiently close alignment.

This differentiating system will be explained with reference to FIGS. 9 to 12.

FIG. 9 shows five container cars 21–25 of a train or groups of cars drawn by the locomotive 26 and waiting on any desired siding 27 of the station into which it has moved to be served by the platform cars, i.e., to have containers and pallets exchanged.

The platform car train unit pulled forwardly at creeping speed on the adjacent track consists, e.g., of five platform cars 28–32 and the small platform car locomotive 33. Graded spring boxes 34–38 suspended between the draw hooks of the platform cars have a relatively long spring deflection and their spring forces correspond in each case to the resistance to rolling of the following cars. For instance, the spring box 34 in FIG. 9 has, e.g., a spring force of about 100 kg. to draw the car 28. The spring box 35 has a spring force of 200 kg. to draw the two cars 28 and 29. The spring box 36 has a force of 300 kg. to draw the three cars 28–30 etc.

It is also shown in FIG. 9 that each platform car, measured at the draw hook, is shorter by about three to five centimeters than the container cars. To align its cars, the platform car train unit is to be stretched even when the container car train is compressed. Owing to the grading and careful matching of the draw hook spring boxes with the resistances to rolling of the following cars and owing to the long spring deflections an overloading of the platform car locomotive 33 by the stretching of the train during alignment of the platform cars 28–33 etc. is prevented. On an average, the tensile force of the spring box 38 remains in an order of magnitude of 500 kg. when five cars are attached behind it. Overstressing of the exactly calibrated and graded spring box is prevented by a stop arranged to limit the spring deflection to the permissible elongation.

In FIG. 10, all platform cars 28 to 32 have been aligned with the container cars 25–21. The short platform car train 28–32 is stretched.

The aligning of the platform cars is initiated by release feelers (FIG. 11) and performed by the application of rail-adhering brakes (FIG. 12). Both operations are individually and independently performed for each platform car. They are pre-controlled by a central control station on the platform car locomotive.

FIG. 11 is a transverse sectional view showing the contour of the platform car 39 on the left and of the container car 40 on the right. The release feeler 41 is swung up to initiate the aligning by the application of the rail-adhering brake and releases the rail brake when the feeler engages the container car 40 to be served. Since the release feeler 41 is divided into four parts along the length of the car, the container exchange position of the platform car 39 can be staggered relative to the container car 40 by ¼, ½ or ¾ if all platform cars are similarly staggered. Although the platform car train is pulled forward at creeping speed immediately before the desired alignment begins, the remainder of the kinetic energy of each car must be dissipated without a disturbance of the exact alignment by inaccurate braking or even slipping. For this purpose a rail-adhering brake is used, which is applied in conjunction with a shuttle movement of the car. This is shown in FIG. 12. The release feeler 41 of FIG. 11 causes the rail brake 42 of FIG. 12 to be magnetized by electric power to adhere firmly to the rail head 43 whereas the remaining kinetic energy of the car is absorbed by the horizontally extending buffer springs 44 acting in the direction of travel. The car shuttles to standstill within the spring deflection and is retained in this position by the rail-adhering brake until the containers have been exchanged. Then only is the magnetizing current switched off and the rail brake is lifted by the vertical holding springs 43.

Transfer Equipment

The containers and pallets are to be transferred from the rail-borne vehicle to the rail-borne vehicle or to the loading platform and vice versa transversely to the direction of travel and the longitudinal direction of the vehicles. To adapt such movements to the operating conditions of railroads, three important requirements must be fulfilled:

(1) During the transportation by the train, the containers and pallets must be anchored on the container cars so as to be stable and unable to slip. On the other hand, they must automatically unlock and lock themselves to perform the transverse transfer movement. The simple and reliable means to ensure stability and automatic unlocking and locking are four corner retaining fitting angles provided according to FIGS. 29 and 30 on the container cars and on the station platform areas adjacent to the track. The containers are lifted out of these corner retaining fitting angles at the beginning of the transverse transfer movement and are lowered within the same when the transverse movement has been completed. The transfer of the containers is thus a combined lifting and translational movement.

(2) To perform the transverse transfer movements of the containers reliably and in a simple manner, additional means to bridge the gap between the inside edges of the rail-borne vehicles must not be used. Only the elimination of such means will permit a fully mechanized and fully automatic performance of the transverse movements of the containers and the simultaneous performance thereof by any desired number of containers. The essential minimum of motive mechanism must be combined in a self-contained unit. The movement across the free gap without bridge means is enabled by a division of the transverse movement on the transfer means in two parts.

(3) The reliability of the transfer of the containers must not be affected by deviations of position in all three dimensions, which deviations are inevitable at least to a small extent. For this reason, no use is made of transverse guide rails, rail connectors and the like. Instead, all parts of the transfer means, and particularly its carrying rollers, are of strong design and have large dimensions. The minimum diameter required for the rubber-tired carrying rollers is 350 mm. The ground clearance of the containers and pallets is about 400 mm.

FIGS. 13 to 15 show diagrammatically the contour of a wheeled platform 46, on which the rolling slide 47 of the transfer means is movable. These views are taken in the longitudinal direction or direction of travel of the platform car, on which the transfer means is anchored. The wheeled platform 46 is eccentrically supported each of its two ends by two or four or more pairs of carrying rollers 49. By a rotation of the eccentric members 50 the pairs of carrying rollers 49 can be swung inwardly (retracted position shown in FIG. 13), outwardly (extended position shown in FIG. 15) and downwardly (lifted position shown in FIG. 15) before, during and after the transfer movement. In the retracted position shown in FIG. 13, the wheeled platform 40 is disposed in position of rest within the profile of the platform car 48. The length of the path of the wheeled platform 46 is exactly adapted to the width of the profile of the car 48.

By the provision for the extended position of the carrying rollers shown in FIG. 14, the profile-limited bridging span of the transfer means and with it the largest possible gap between the inside edges of the cars is increased.

To assume the lifted position, which is shown in FIG. 15 and in which the carrying rollers are swung down, the platform frame with the container or pallet is lifted from the car floor and is lifted from the corner retaining fitting angles, which are unlocked at the same time.

The rolling slide 47 movably mounted on the wheeled platform frame and shown in FIGS. 13 to 15 has a length which is about one-half to two-thirds of the length of the frame of the wheeled platform 46 and is movable on the latter toward both sides to such an extent as is compatible with the stability of the slide when carrying a container.

The sequences of the phases of movement whereby the two-part transfer means transfers the container or pallet from one rail-borne vehicle to another is shown in FIGS. 16 to 21. In all said figures, the contour of the platform car 48 with the transfer means initially anchored thereon is shown on the right and the contour of a container car 51 is shown on the left. Thus, the transfer of a container from the container car 51 to the platform car 48 is shown.

In FIG. 16, the transfer means is in its initial position or position of rest, in which it is disposed within the profile. To remain within the profile, the carrying rollers 49 are swung inwardly (retracted position). From the initial position the unloaded wheeled platform 46 is moved until its temporarily unsupported two or more double pairs of carrying rollers 49 have reached the opposite edge of the container car. This edge is rounded to facilitate the riding of the rollers thereon. During the movement of the temporarily unsupported two pairs of The arrangement of the winch 68 and reversing pulleys 69 is readily apparent in FIG. 26 in an end view and in FIG. 28 in a top plan view.

The corner retaining fitting angles 73 shown in FIGS. 29 and 30 perform a dual function. On the one hand, they anchor and hold the containers or pallets 53 on the container car 51 against undesired slipping and tilting during their transportation on rail. On the other hand, the container or pallets must be re-centered while being lowered after each transverse movement between the platform cars 48 and the container car 51 or between platform cars 48 and the track-side platform area in order to avoid an accumulation of inevitable small position errors. For this reason the corner retaining fitting angles are required and provided not only on the container car 51 but also on the platform cars 48 and in the platform area beside the track. As is apparent from FIG. 29, the inside surfaces 74 of these angles are inwardly and downwardly inclined to mate the similar outside bevel of the four corner feet 75 of the containers or pallets 53. Viewed from all sides the corner feet 75 have the form shown in FIG. 29. Thus, lift transfer devices or individual lift transfer vehicles on the loading platforms, on the road and on all yard and shed areas of the consignors and consignees can move from all four sides below the containers and pallets 53 and transfer them as desired.

This form of the self-supporting and liftable container enables also the use of narrow-gage railroads for transporting the same because a container may be turned through 90° and transported in the longitudinal direction, where it has a smaller profile.

The arrangement of the corner retaining fitting angles 73 on the four corners of a container position is shown in FIG. 30 in a top plan view for the sake of completeness.

The locking and unlocking of the containers and pallets is shown in FIGS. 31 and 32. The container is automatically locked by interengaging with the spring-loaded angles (FIG. 32) and is unlocked when the transfer means moves below the container (FIG. 31). For this purpose the wheeled platform 46 is formed with runners 76, which are in the position shown in FIG. 31 for unlocking and in the position shown in FIG. 32 for locking. In the position shown in FIG. 31 the runners 76 engage a lever 77, which forms the free arm of a double lever 78. By means of the links 79, the double lever 78 is connected to the locking bars 81, which are guided at 80 in the containers or pallets 53 and in the locking position shown in FIG. 32 are received by the sockets 82 of the corner retaining fitting angles 73 and retained in locking position by springs 83. When a movement of a wheeled platform 46 in the direction of arrow 84 or 85 causes a runner 76 to move from the position of FIG. 32 to the position of FIG. 31, the parts 77, 78, 79, 81 will assume the position shown in FIG. 31, which means that the wheeled platform automatically unlocks the container or pallet 53. Unlocking will also be effected when the runners 76 leave the position of FIG. 31 and assume the position of FIG. 32 because the wheeled platform 46 has been moved in one of the directions 86, 87.

What is claimed as new and desired to be secured by Letters Patent is as follows:

1. Equipment for simultaneously transferring containers onto and from a plurality of container cars coupled together by extensible couplings to form a container car train comprising, in combination, a plurality of platform cars connected to each other by extensible couplings to form a platform car train movable on tracks of a station along a loading platform and along said container car train; transfer means on each platform car for transferring containers for said loading platform to said platform cars of said platform car train and from the latter to said cars of said container car train and vice versa; while said container car train is standing still; and cooperating aligning means on each of said container cars of said container car train and on each of said platform cars of said platform car train for automatically aligning said transfer means on said platform car with said container cars, respectively, so as to make possible simultaneous transfer of containers from a plurality of container cars onto a plurality of platform cars and vice versa regardless of variations of the distances between the coupled container cars of ths container car train resulting from different extensions of the extensible couplings.

2. Equipment as set forth in claim 1, said transfer means comprising at least one wheeled platform on each platform car, said wheeled platform being adapted to be moved relative to said platform car at right angles to the longitudinal direction of said platform car, rails carried by each wheeled platform and extending in a longitudinal direction at right angles to the longitudinal direction of the platform car carrying the wheeled platform, said platform car being provided at each of its longitudinal edges with guide rollers for said rails, which guide rollers are adapted to support the overhanging wheeled platform during the transfer to a container car, a rolling slide movably arranged on said wheeled platform and movable relative thereto the same direction in which the wheeled platform is movable relative to the platform car, drive means adapted to move the rolling slide relative to the wheeled platform.

3. Equipment for simultaneously transferring containers onto and from a plurality of container cars coupled together by extensible couplings to form a container car train comprising, in combination, a plurality of platform cars connected to each other by extensible couplings to form a platform car train movable on tracks of a station along a loading platform and along said container car train; transfer means on each platform car for transferring containers from said loading platform to said platform cars of said platform car train and from the latter to said container cars of said container car train and vice versa; and cooperating aligning means on each of said container cars of said container car train and on each of said platform cars of said platform car train for automatically aligning said transfer means on said platform cars with said container cars, repectively, so as to make possible simultaneous transfer of containers from a plurality of container cars onto a plurality of platform cars and vice versa regardless of variations of the distances between the coupled containers cars of the container car train resulting from different extensions of the extensible couplings, said cooperating aligning means comprising a feeler on each of said container cars, feeler means on each of said platform cars adapted to move into contact with the feeler on a container car when the latter is in a transveresly aligned position with the respective container car, and magnetic rail brake means on each platform car to be actuated by said feeler means upon contact thereof with said feeler on the respective contact car.

4. Equipment for simultaneously transferring containers onto and from a plurality of container cars coupled together by extensible couplings to form a container car train comprising, in combination, a plurality of platform cars connected to each other to form a platform car train movable on tracks of a station along a loading platform and along said container car train; transfer means on each platform car for transferring containers for said loading platform to said platform cars of said platform car train and from the latter said container cars of said container car train and vice versa, while said container car train is standing still; cooperating aligning means on each of said container cars of said container car train and on each of said platform cars of said platform car train for automatically aligning said transfer means on said platform cars with said container cars, repectively, so as to make possible simultaneous transfer of containers from a plurality of container cars onto a plurality of platform cars carrying rollers 49, the wheeled platform 46 is guided and part of its weight is supported by two stationary resilient guiding and carrying rollers at the inside edges of the platform cars, as will be explained with reference to FIGS. 22 and 23. These guiding and carrying rollers guide special-profile rails of the wheeled platform, as is shown in front and side elevations in FIGS. 22 and 23. At the same time, the eccentric members 50 are rotated to swing all pairs of carrying rollers 49 out of the retracted position in order to increase the bridging span. As the movement of the wheeled platform 46 is continued, its transferred pairs of carrying rollers 49 roll on the floor 52 of the opposite container car 51 beyond the center of the vehicle and the platform 46 moves below the container or pallet 53 until a stop is reached.

During the outward movement of the wheeled platform, the slide 47 carried by rollers 54 is moved on the platform 46 in the same direction to the end position on the other side and assumes then the central position on the container car 51 and below the container 53. This position assumed before the lifting of the container is shown in FIG. 17. By an inward rotation of the eccentric members 50 associated with the carrying rollers, the wheeled platform 46 and the rolling slide 47 are first lifted and forced against the container bottom 55, whereafter the container 53 itself is lifted out of corner retaining fitting angles, which will be described hereinafter. This phase is shown in FIG. 18. During the subsequent return movement of the wheeled platform 46, the rolling slide 47 carrying the container 53 is moved back on the wheeled platform 46 to its initial position at the right-hand end of the wheeled platform. The rolling slide 47 with the container 53 assumes a central position on the platform car 48 as soon as the outermost pairs of carrying rollers 49 of the wheeled platform 46 are just about to reach the inside edge 56 of the floor 51 of the container car. The wheeled platform may be temporarily supported only by these outermost pairs of carrying rollers, which are the last to leave the container car, because the center of gravity of the weight of the container has previously been shifted to the platform car by means of the rolling slide. The container has then reached a central position on the platform car 48 and is disposed within the profile thereof and is lowered before the above-mentioned pairs of carrying rollers 49 leave the edge 56 of the container car 51 and are now unloaded and unsupported until they are placed on the car edge 57 and return to the initial position. During the above-described double movement of the wheeled platform 46 and the rolling slide 47, the eccentric members 50 associated with the carrying rollers are swung inwardly to some extent to a slightly inwardly directed position and are swung in entirely only when the container is to be set down within the profile of the platform car (retracted position).

The several phases of these movements are shown as follows:

In FIG. 19 the wheeled platform 46, the slide 47 and the container 53 are in the middle between the container car 51 and the platform car 48.

In FIG. 20 the rolling slide 47 with the container 53 is already at the center of the platform and within the profile thereof but is still lifted. The outermost pairs of carrying rollers 49 of the wheeled platform on the left are disposed slightly to the right of the inside edge 56 of the container car floor 52 before they leave the container car 51.

In FIG. 21 the container 53 has already been set down. The wheeled platform 46 and the rolling slide 47 are in initial position.

Between the two phases shown in FIGS. 20 and 21, the four or more pairs of carrying rollers have been swung inwardly to the retracted position and the container has been lowered within the profile of the platform car. The two extreme pairs of carrying rollers on the left have been transferred in unloaded condition from the container car 51 to the floor 58 of the platform car 48.

*Delivery of the container*

The transfer from the platform car 48 to the container car 51 or to the marginal area of the loading platforms is performed in approximately the reverse succession. Just as during the receiving operation, the first pair of rollers 49 is first moved onto the edge 56 of the container car and is swung outwardly (rotation of eccentric member). Immediately after it has been engaged the opposite car edge, the rolling slide 47 has reached exactly the center of the platform car and container and by the rotation of the axle eccentric is forced against the container bottom 55 together with the wheeled platform frame. The container 53 is lifted and by the divided, simultaneous translatory movement of the wheeled platform 46 and the rolling slide 47 is moved to its end position within the profile of the container car 51, where it is set down. The axle eccentrics have assumed a slightly outwardly directed (semi-extended) position during the transfer movement. The wheeled platform has again been rolled only by a limited distance, the two groups of (two or more) pairs of rollers 49 rolling on the floor of one and the other of the two cars, respectively. To lower the container, the axle eccentrics are swung entirely outwardly (extended position). When the container has been set down, the wheeled platform 46 returns to its initial position in unloaded and partly unsupported condition while the axle eccentrics 50 have swung the pairs of rollers 49 entirely inwardly to the retracted position.

In FIGS. 22 and 23 the wheeled platform of the transfer means is shown in detail whereas the rolling slide and the means for moving the same have not been shown. In the end view shown in FIG. 22 the wheeled platform 46 is shown in the left-hand half in elevation in the lower position and in the right-hand half in transverse section in a raised position. The main parts of the wheeled platform are the top main frame 60 with cross-members 61, which support by means of rollers or balls 54 the relatively slidable rolling slide 57. Numerals 49 designate four eccentrically mounted, rubber-tired pairs of carrying rollers. Numerals 63 designate guide rails, which during the transfer of the pairs of carrying rollers 49 in unsupported and unloaded condition between the inside edges of the cars are guided and supported by the stationary guiding and carrying rollers 64. To enable the rotation of the eccentrics in the opposite direction, the guide rail 63 is guided on the right in an elongated hold 65. FIGS. 22 and 23 show one of the mechanical drives 66 for rotating the eccentric members 50 to swing the pairs of carrying rollers 49 in and out.

The extending and retracting movement of the wheeled platform for transferring the container may also be hydraulically effected with a pusher 67 consisting of a cylinder and a piston or by electromagnetic means.

FIGS. 24 to 26 show diagrammatically a rope drive comprising an electric winch 68 and reversing pulleys 69. The symmetrical arrangement of this drive enables the outward movement on both sides without requiring a reversing mechanism. The rope drum designed as a winch with electric gearmotor 68 winds and unwinds the continuous rope 70, 71 at the same time. Thus, the rope extends around the drum only in the number of turns required to transmit the tractive force by adhesive friction. The two rope ends 70, 71 extend from the rope drum 68 and around the reversing pulleys 69 to the respective opposite ends of the platform frame 72 and are secured to the inside thereof. The symmetric rope arrangement is clearly apparent from the FIGS. 24 to 26 showing the wheeled platform in three transfer positions and enables the outward movement of the platform toward both sides, i.e., also to the right.

and vice versa regardless of variations of the distances between the coupled container cars of the container car train, resulting from different extensions of the extensible couplings; and said spring couplings between said platform cars of said platform car train adapted to absorb tension forces occurring during pulling of said platform car train and permitting stretch of said platform car train during alignment of the platform cars with said container cars of said container car train, the spring constants of said spring couplings being graded so that the forces developed by said spring couplings decrease from the first platform car in direction of the movement of said platform car train to the last car thereof.

5. Equipment as set forth in claim 1 in which said containers having each a bottom wall and support means extending downwardly in the region of opposite transverse edge portions of said bottom wall to keep the latter a certain distance above a surface on which said container is supported, and each of said transfer means comprising a platform extending transverse to the longitudinal direction of the respective platform car; a pair of wheel means respectively arranged on opposite ends of said platform for supporting the same; mounting means for each of said wheel means and mounting the same on said platform for movement between a retracted position in which said wheel means in their entirety are located between said opposite ends of said platform with the axes of said wheel means spaced a given distance from the upper surface of said platform, an extended position in which said wheel means at least partly extend beyond said opposite ends of said platform, and a raised position in which said axes are spaced a greater distance from said upper surface of said platform than said given distance so that the platform is raised relative to said platform car; means operatively connected to said mounting means for simultaneously moving said wheel means between said positions thereof; moving means mounted on said platform car and connected to said platform for moving the same in said transverse direction between a rest position in which said platform is in its entirety supported on said platform car and a first extended position in which said platform is extended to one side of the platform car to bridge the gap between the platform car and a container car on one side of the platform car and aligned therewith and a second extended position in which said platform is extended to the other side of said platform car to bridge the gap between the latter and the loading platform with one of said wheels means located beneath the bottom wall and between the support means thereof of a container; and a rolling slide mounted on said platform movable in said transverse direction relative thereto, said rolling slide having an upper surface movable below said bottom wall of the respective container when said wheel means are in one of said extended positions and the upper surface of said rolling slide engaging said bottom wall and lifting the respective container when said wheel means are in said raised position.

6. Equipment as set forth in claim 5 in which said mounting means comprise at least one bearing for each of said wheel means fixed to the platform, and shaft means having a first shaft portion turnably mounted in said bearing and a second shaft portion fixed to said first shaft portion spaced therefrom and substantially parallel thereto and supporting said wheel means.

References Cited by the Examiner
UNITED STATES PATENTS

| | | | |
|---|---|---|---|
| 157,514 | 12/1874 | Hawkins | 104—20 |
| 1,013,826 | 1/1912 | Stegeman | 214—38.46 |
| 1,040,229 | 10/1912 | McCune | 214—38.8 X |
| 1,301,616 | 4/1919 | Stephenson et al. | 280—43.16 |
| 1,437,964 | 12/1922 | Fitch | 214—38.42 X |
| 1,452,541 | 4/1923 | Willoughby | 213—7 |
| 1,708,649 | 4/1929 | Bente | 280—43.16 |
| 1,783,363 | 12/1930 | Grob | 214—38.8 X |
| 1,830,740 | 11/1931 | Leech et al. | 214—16.42 X |
| 2,096,958 | 10/1937 | Clerc | 214—16.42 X |
| 2,117,067 | 5/1938 | Ludington | 214—516 |
| 2,127,429 | 8/1938 | Schoepf et al. | 188—165 X |
| 2,447,559 | 8/1948 | Bloemers | 214—152 |
| 2,647,647 | 8/1953 | Alimanestiano. | |
| 2,691,450 | 10/1954 | Rosenbaum | 214—38.8 |
| 2,714,967 | 8/1955 | Olsen | 214—38 |
| 2,813,974 | 11/1957 | McHugh | 214—38.46 |
| 2,831,588 | 4/1958 | Seed | 214—38.40 |
| 2,845,189 | 7/1958 | Sanders | 214—16.14 |
| 2,963,180 | 12/1960 | Sanders | 214—16.14 |
| 3,014,604 | 12/1961 | Loomis | 214—38.46 |

GERALD M. FORLENZA, *Primary Examiner.*

HUGO O. SCHULZ, *Examiner.*